(12) United States Patent
Kawano et al.

(10) Patent No.: US 10,227,151 B2
(45) Date of Patent: Mar. 12, 2019

(54) FUNCTIONAL TRAYS FOR HANDLING PRODUCTS IN A MATERIALS HANDLING FACILITY

(71) Applicant: Amazon Technologies, Inc., Reno, NV (US)

(72) Inventors: Yasushi Kawano, Chiba-ken (JP); Toru Kano, Chiba-ken (JP)

(73) Assignee: Amazon Technologies, Inc., Seattle, WA (US)

( * ) Notice: Subject to any disclaimer, the term of this patent is extended or adjusted under 35 U.S.C. 154(b) by 823 days.

(21) Appl. No.: 14/432,973

(22) PCT Filed: Oct. 3, 2012

(86) PCT No.: PCT/US2012/000457
§ 371 (c)(1),
(2) Date: Apr. 1, 2015

(87) PCT Pub. No.: WO2014/055056
PCT Pub. Date: Apr. 10, 2014

(65) Prior Publication Data
US 2015/0274338 A1    Oct. 1, 2015

(51) Int. Cl.
*B43M 7/00* (2006.01)
*B43M 3/00* (2006.01)
(Continued)

(52) U.S. Cl.
CPC .............. *B65B 57/00* (2013.01); *B43M 3/04* (2013.01); *B43M 3/045* (2013.01); *B43M 5/04* (2013.01);
(Continued)

(58) Field of Classification Search
CPC ....... B65B 43/00; B65B 43/26; B65B 43/265; B65B 43/42; B65B 43/52; B65B 35/205;
(Continued)

(56) References Cited

U.S. PATENT DOCUMENTS 2,629,214 A * 2/1953 McVey ................... B43M 5/042
53/381.7
2,736,999 A * 3/1956 Rouan .................... B43M 3/045
229/68.1
(Continued)

FOREIGN PATENT DOCUMENTS

CN     1126972 K      7/1996
CN     1166164 A     11/1997
(Continued)

OTHER PUBLICATIONS

International Search Report dated Jan. 3, 2013, for corresponding International Application No. PCT/US2012/000457, 1 page.
(Continued)

*Primary Examiner* — Gloria R Weeks
(74) *Attorney, Agent, or Firm* — Seed IP Law Group LLP

(57) ABSTRACT

A conveyor system is provided including a conveyor and a plurality of functional trays that are removably attachable to the conveyor. Each tray includes a plate having first and second dimensions that are orthogonal to each other, and the plate includes a coupler configured to be removably attached to the conveyor with the second dimension of the plate being in parallel with a moving direction of the conveyor. The plurality of functional trays include one or more of an envelope-opening mechanism, an item-pushing mechanism, an envelope-closing mechanism, an item-wrapping mechanism, and a tray-height-adjustment mechanism. For example, the item-pushing mechanism includes a pusher slidably coupled to the plate, and a linear actuator configured to move the pusher relative to the plate along the first dimension so as to push an item off the functional tray.

19 Claims, 14 Drawing Sheets

(51) Int. Cl.

| | | |
|---|---|---|
| B65B 57/00 | (2006.01) | |
| B65B 35/20 | (2006.01) | |
| B65B 5/04 | (2006.01) | |
| B43M 3/04 | (2006.01) | |
| B43M 5/04 | (2006.01) | |
| B65B 43/34 | (2006.01) | |
| B65B 43/52 | (2006.01) | |
| B65B 51/14 | (2006.01) | |
| B65B 53/02 | (2006.01) | |
| B65B 5/10 | (2006.01) | |
| B65B 7/06 | (2006.01) | |
| B65B 11/02 | (2006.01) | |
| B65B 11/00 | (2006.01) | |
| B65B 53/00 | (2006.01) | |
| B65G 17/12 | (2006.01) | |
| B65G 17/34 | (2006.01) | |

(52) U.S. Cl.
CPC .............. *B43M 5/042* (2013.01); *B43M 7/00* (2013.01); *B65B 5/04* (2013.01); *B65B 5/045* (2013.01); *B65B 5/106* (2013.01); *B65B 7/06* (2013.01); *B65B 11/00* (2013.01); *B65B 11/02* (2013.01); *B65B 35/205* (2013.01); *B65B 43/34* (2013.01); *B65B 43/52* (2013.01); *B65B 51/146* (2013.01); *B65B 53/00* (2013.01); *B65B 53/02* (2013.01); *B65G 17/12* (2013.01); *B65G 17/345* (2013.01); *B65B 2210/02* (2013.01); *B65B 2210/04* (2013.01)

(58) Field of Classification Search
CPC ......... B65B 43/28; B31B 19/00; B31B 21/00; B43M 3/00; B43M 3/04; B43M 3/045; B43M 7/00
USPC .... 53/558, 564, 569, 574, 579, 381.5, 381.6
See application file for complete search history.

(56) References Cited

U.S. PATENT DOCUMENTS

| | | | |
|---|---|---|---|
| 2,964,136 A | 12/1960 | Schnell | |
| 2,964,163 A | 12/1960 | Christiansen et al. | |
| 4,020,615 A * | 5/1977 | Irvine | B43M 3/045 271/2 |
| 4,205,506 A * | 6/1980 | Moens | B43M 3/045 53/569 |
| 4,337,609 A * | 7/1982 | Foster | B43M 3/045 53/284.3 |
| 4,525,986 A * | 7/1985 | Noll | B43M 5/042 53/252 |
| 4,716,714 A | 1/1988 | Tisma | |
| 4,809,482 A * | 3/1989 | Horton | B65B 5/026 53/131.3 |
| 4,817,368 A * | 4/1989 | DePasquale | B43M 5/042 271/119 |
| 4,829,751 A | 5/1989 | Tisma | |
| 4,922,689 A * | 5/1990 | Haas | B43M 3/045 53/284.3 |
| 4,944,137 A | 7/1990 | Krasuski et al. | |
| 5,024,042 A * | 6/1991 | Meyer | B65B 39/007 53/168 |
| 5,056,297 A | 10/1991 | Fallos | |
| 5,125,215 A * | 6/1992 | Orsinger | B43M 3/045 53/381.6 |
| 5,144,790 A | 9/1992 | Tisma | |
| 5,168,689 A * | 12/1992 | Macelis | B43M 3/045 53/284.3 |
| 5,211,384 A * | 5/1993 | Orsinger | B43M 3/045 198/438 |
| 5,301,935 A * | 4/1994 | Miki | B43M 5/042 270/45 |
| 5,430,990 A * | 7/1995 | Long | B43M 3/045 53/252 |
| 5,457,941 A | 10/1995 | Long et al. | |
| 5,675,959 A * | 10/1997 | Hamma | B43M 3/045 53/381.1 |
| 5,706,636 A * | 1/1998 | Eckl | B43M 3/045 53/284.3 |
| 5,715,648 A * | 2/1998 | Yates | B43M 3/045 493/245 |
| 5,722,221 A | 3/1998 | Maltman et al. | |
| 5,737,899 A * | 4/1998 | Supron | B43M 3/045 53/155 |
| 5,890,584 A | 4/1999 | Bonnet | |
| 5,954,323 A * | 9/1999 | Emigh | B43M 3/045 270/58.06 |
| 5,960,607 A * | 10/1999 | Bohn | B43M 5/04 493/216 |
| 5,975,514 A * | 11/1999 | Emigh | B43M 3/045 270/58.06 |
| 5,992,132 A * | 11/1999 | Auerbach | B43M 3/045 493/259 |
| 6,032,714 A | 3/2000 | Fenton | |
| 6,094,894 A * | 8/2000 | Yates | B43M 5/042 53/505 |
| 6,134,865 A | 10/2000 | Long | |
| 6,772,575 B2 | 8/2004 | Limousin | |
| 6,854,242 B2 | 2/2005 | Stork et al. | |
| 7,395,639 B2 * | 7/2008 | Brauneis | B65G 23/38 53/284.3 |
| 7,404,556 B2 | 7/2008 | Allen, Jr. et al. | |
| 8,430,229 B2 | 4/2013 | Abbestam | |
| 9,359,095 B2 * | 6/2016 | Hoepner | B43M 3/04 |
| 2010/0251673 A1 | 10/2010 | Herapath et al. | |
| 2010/0252399 A1 | 10/2010 | Abbestam | |
| 2011/0099946 A1 * | 5/2011 | Fijnvandraat | B43M 3/045 53/381.5 |

FOREIGN PATENT DOCUMENTS

| | | |
|---|---|---|
| CN | 201473022 U | 5/2010 |
| CN | 101801596 A | 8/2010 |
| DE | 41 37 246 A1 | 7/1992 |
| GB | 1 460 897 A | 1/1977 |
| JP | 2002-503193 A | 1/2002 |
| JP | 2002-503608 A | 2/2002 |

OTHER PUBLICATIONS

Extended European Search Report, dated Jun. 8, 2016, for European Application No. 12886014.5-1708 / 2903920, 10 pages.
Official Notice of Rejection (with English Translation), dated Jun. 7, 2016, for Japanese Application No. 2015-535615, 9 pages.
Supplemental Partial European Search Report for corresponding EP Application No. 12886014; dated Feb. 18, 2016; (7) Seven pages.
Chinese Office Action dated Nov. 2, 2015, for corresponding CN Application No. 201280076258.9, 16 pages.

* cited by examiner

Item

FUNCTIONAL TRAYS FOR HANDLING PRODUCTS IN A MATERIALS HANDLING FACILITY

BACKGROUND

Electronic marketplaces, such as those accessible via the Internet, may include a catalog of items or products available for purchase. These items may be offered as the basis for commerce (e.g., sale or trade). In one example, customers may utilize a web browser to visit a merchant's website, select an item for purchase from the catalog, and engage in a checkout process to finalize an order for the item. The merchant may operate a fulfillment network including various facilities in order to process such orders. For instance, the merchant may include a facility that prepares shipments of purchased items. A shipment carrier may acquire such shipments from the merchant and deliver the shipments to the respective purchasing customers.

The facilities operated by the merchant may include various fulfillment processes for fulfilling orders submitted by customers. These processes may operate on items to perform various tasks, such as sorting items, transferring items from one location to another, and preparing items for shipment. As specific examples, items together with a shipping bill may be wrapped (e.g., shrink-wrapped) and placed in a shipping envelope or a box, or may be placed directly in a shipping envelope or a box. At one or more points in these processes, items are carried on a conveyor belt, to be transferred onto another conveyor belt, onto a workstation, or into a sorting bin or a shipment box.

The present invention is directed to providing functional trays to be removably attached to a conveyor, wherein the functional trays each have one or more functions such as opening an envelope (or a shipping bag), pushing an item into an opened envelope, closing the envelope, and wrapping (e.g., shrink-wrapping) one or more items into one package. These various functions are performed by the functional trays. The present invention is also directed to providing a conveyor system including a conveyor and a plurality of functional trays each removably attachable to the conveyor. Since different functional trays may be configured to have different functions, an operator of the conveyor system may readily exchange different functional trays on the conveyor. Thus, the operator may modify the overall function of the conveyor depending on the type of items to be processed and the type of processing/handling to be performed on the conveyor.

BRIEF DESCRIPTION OF THE DRAWINGS

FIG. 4 further illustrates a secondary conveyor arranged adjacent to the (main) conveyor to receive (stuffed) envelopes processed by the functional trays.

While the functional trays and a conveyor system including the functional trays are described herein by way of example for several embodiments and illustrative drawings, those skilled in the art will recognize that the functional trays and a conveyor system including the functional trays are not limited to the embodiments or drawings described. It should be understood that the drawings and detailed description thereto are not intended to limit the functional trays and a conveyor system including the functional trays to the particular form disclosed, but on the contrary, the invention is to cover all modifications, equivalents and alternatives falling within the scope of the functional trays and a conveyor system including the functional trays as defined in the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
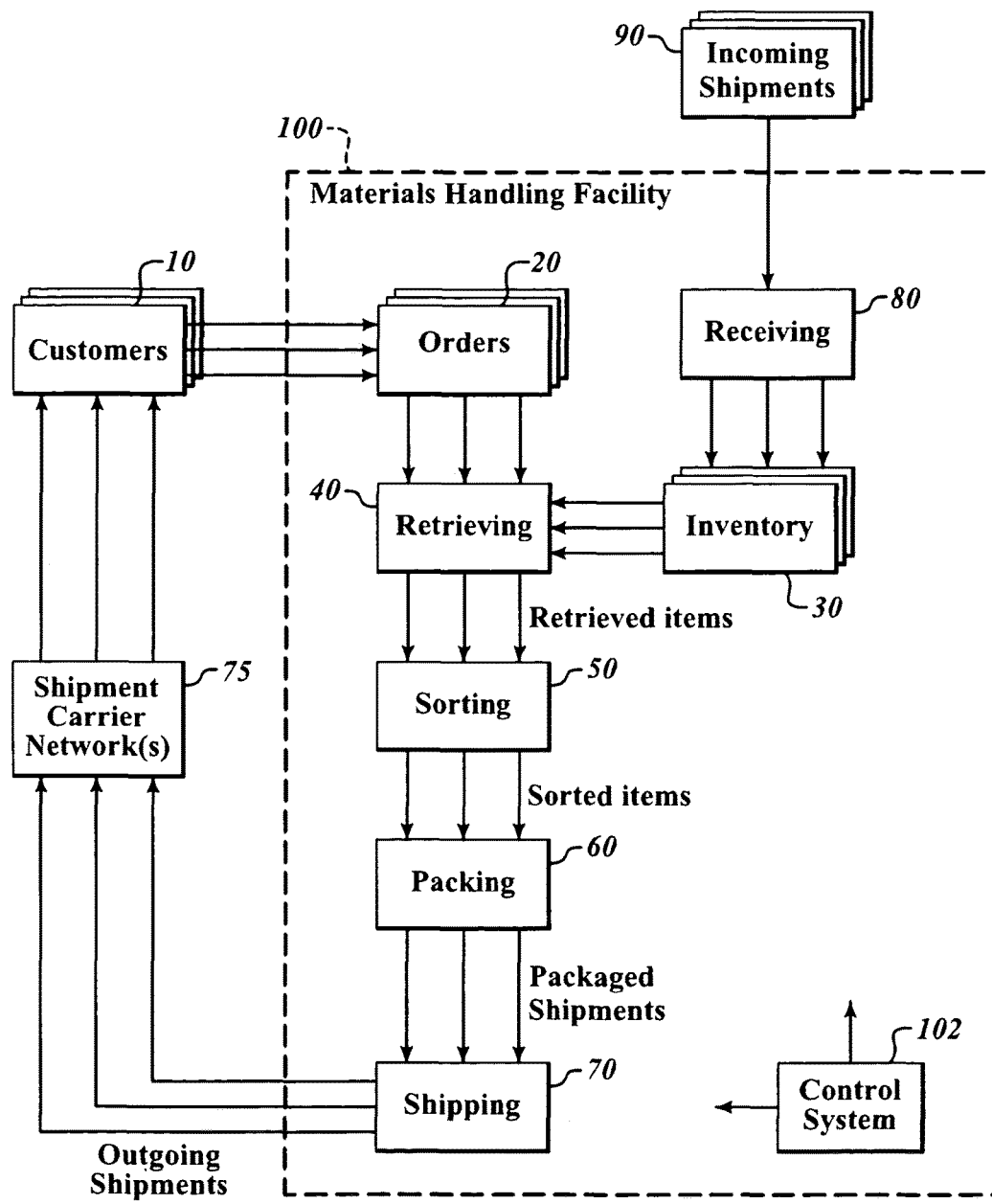
FIG. 1 illustrates a logical representation of the operations of a materials handling facility, according to some embodiments.

Various embodiments of functional trays are described, which are removably attachable to a conveyor arranged in a materials handling facility. FIG. 1 illustrates a logical representation or view of the operation of an exemplary materials handling facility 100, in which the functional trays and a conveyor system including the functional trays according to various embodiments may be used. In various embodiments, a fulfillment network including multiple materials handling facilities (each of which may be configured in a manner similar to that of materials handling facility 100) may be responsible for fulfilling multiple orders, such as orders placed through an electronic commerce ("e-commerce") portal.

In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, FIG. 1 may illustrate an order fulfillment center of a product distributor, according to some embodiments. Multiple customers 10 may submit orders 20 to the product distributor through an ecommerce portal or other electronic marketplace, wherein each order 20 specifies one or more items from inventory 30 to be shipped to the customer that submitted the order. The inventory 30 includes incoming shipments 90 that have gone through receiving 80. To fulfill the customer orders 20, the one or more items specified in each order may be retrieved from inventory 30 (which may also be referred to as stock storage) in the materials handling facility, as indicated at 40. Retrieved items may be delivered or conveyed to one or more stations in the materials handling facility for sorting 50 into their respective orders, to packing 60, shipping 70, and finally to shipment carrier network(s) 75 to the customers 10. In various embodiments, the functional trays and a conveyor system including the functional trays according to the present invention may be used mainly in the packing 60 stage, where sorted items or products retrieved from the inventory 30 are received on one or more conveyor belts to be packaged for shipment purposes. Of course, the functional trays may also be used in any other stages depicted in the materials handling facility 100.

Figure 2:
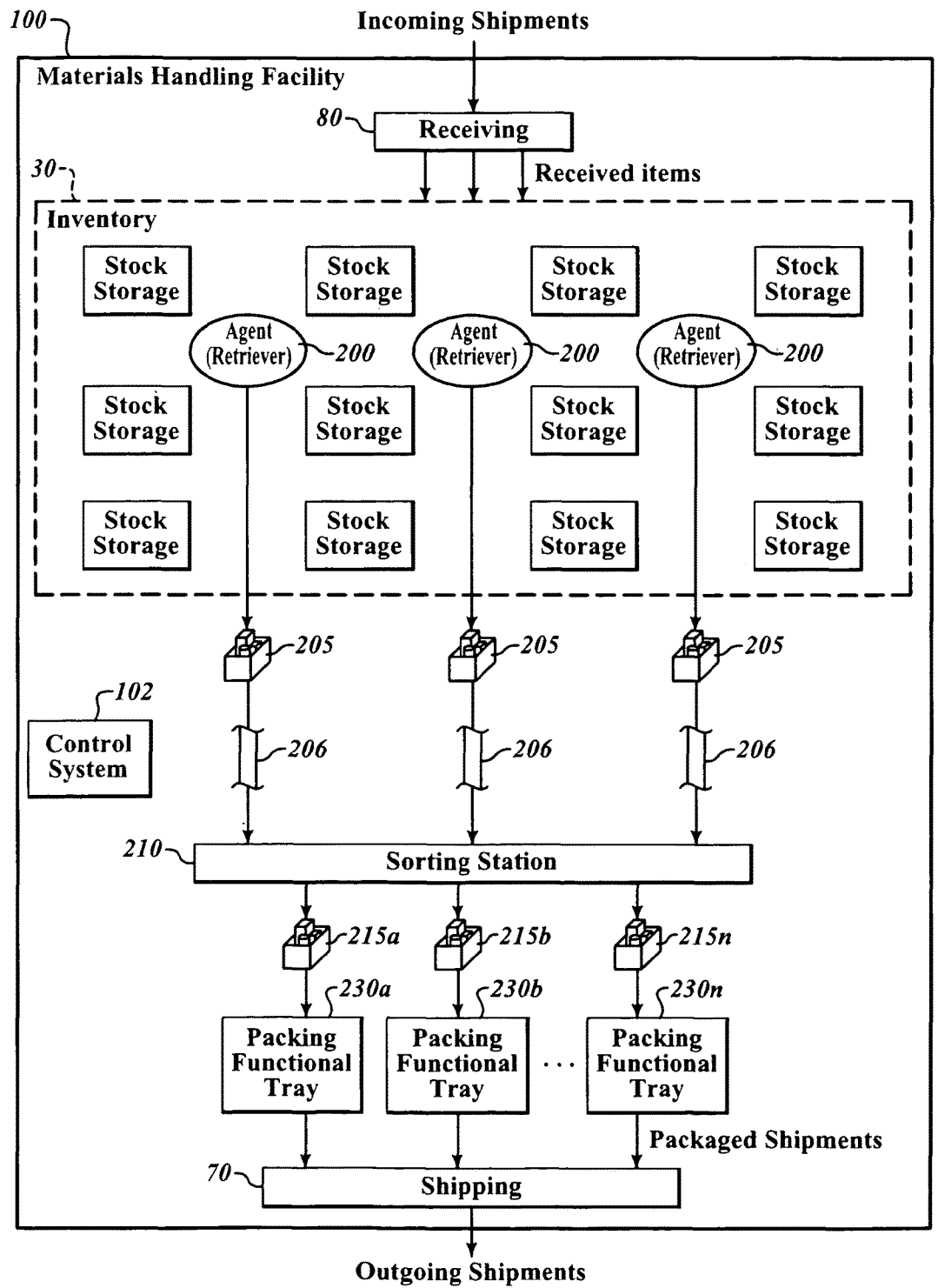
FIG. 2 illustrates an example physical layout for a materials handling facility, according to some embodiments.

FIG. 2 illustrates an exemplary physical layout of a materials handling facility, such as an order fulfillment facility or center, in which embodiments of the functional trays and a conveyor system including the functional trays may be implemented. Requests (e.g., orders) for items from requestors may be divided among multiple agents (retrievers) 200, who then retrieve items from the inventory 30. Retrieved units of items may be placed into receptacles 205 (e.g., totes or carts) for delivery. The orders may be subdivided among the agents 200; therefore, two or more of the agents 200 may retrieve items for one order and, also, each receptacle 205 may contain items for two or more orders. The retrieved items may be conveyed to a sorting station 210 or stations (there may be more than one sorting station 210) on one or more conveyance devices (e.g., conveyor belts) 206. For example, the agents 200 may "dump" the items contained in their receptacles 205 onto one or more conveyor belts 206, which extend to any of the sorting stations 210.

At the sorting station 210, the retrieved items conveyed on one or more conveyor devices are then sorted according to the orders 20 to thereby generate sorted groups of items 215a through 215n that respectively correspond to orders a through n. In some embodiments, the sorted groups of items 215a through 215n are respectively placed on (packing) functional trays 230a through 230n to be packaged for shipment. The functional trays 230a-230n may be attached to one or more conveyors such that the packing operation is performed on the functional trays while the functional trays are being transported to one or more different locations for further processing. For example, different conveyors may be provided for different shipping address regions, such that the sorted groups of items 215 addressed to one geographic region are placed onto the functional trays attached to one conveyor, while the sorted groups of items 215 addressed to another geographic region are placed onto the functional trays attached to another conveyor. Thus, these conveyors respectively deliver packaged groups of items, which are sorted by their shipping addresses. As another example, different conveyors may be provided for different types of packing operations, such that the sorted groups of items 215 to be shipped in envelopes are placed on the functional trays (configured to place the items in envelopes) attached to one conveyor, while the sorted groups of items 215 to be shipped in boxes are placed on the functional trays (configured to place the items in boxes) attached to another conveyor. Since the functional trays of the present invention are removably attachable to different conveyors, various configurations of an overall conveyor system are possible based on different combinations and arrangement of one or more conveyors and functional trays.

Still referring to FIG. 2, the packaged shipments are then processed at shipping 70 and forwarded to a shipment carrier for delivery to respective customers.

Figure 3:
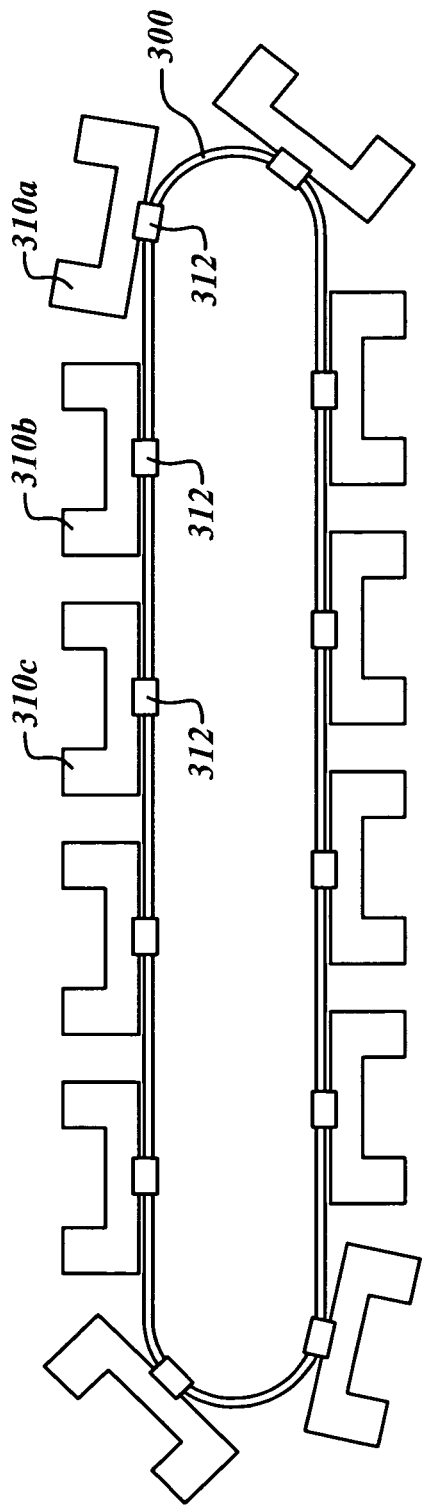
FIG. 3 is a schematic side view of a conveyor, to which multiple functional trays are removably attached, according to some embodiments.

FIG. 3 is a schematic side view illustrating a conveyor 300 (e.g., a conveyor belt, roller system, or other conveyance mechanism), to which multiple functional trays 310a, 310b, 310c, . . . are removably attached via a coupler 312 provided on each tray 310. The coupler 312 may be a latch mechanism, bolts, or any other fastening mechanism configured to readily and removably engage the functional tray 310 with a corresponding element provided on the conveyor 300.

Figure 4:
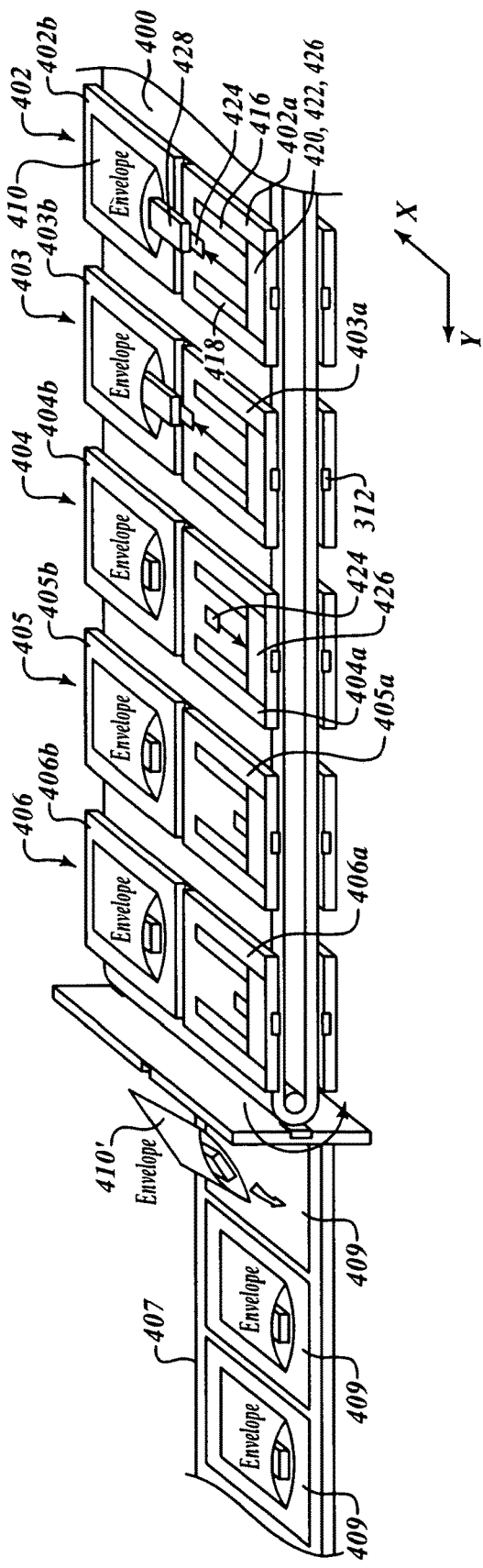
FIG. 4 illustrates an example of a conveyor, to which functional trays are attached that each include an envelope-opening mechanism and an item-pushing mechanism.
Figure 5:
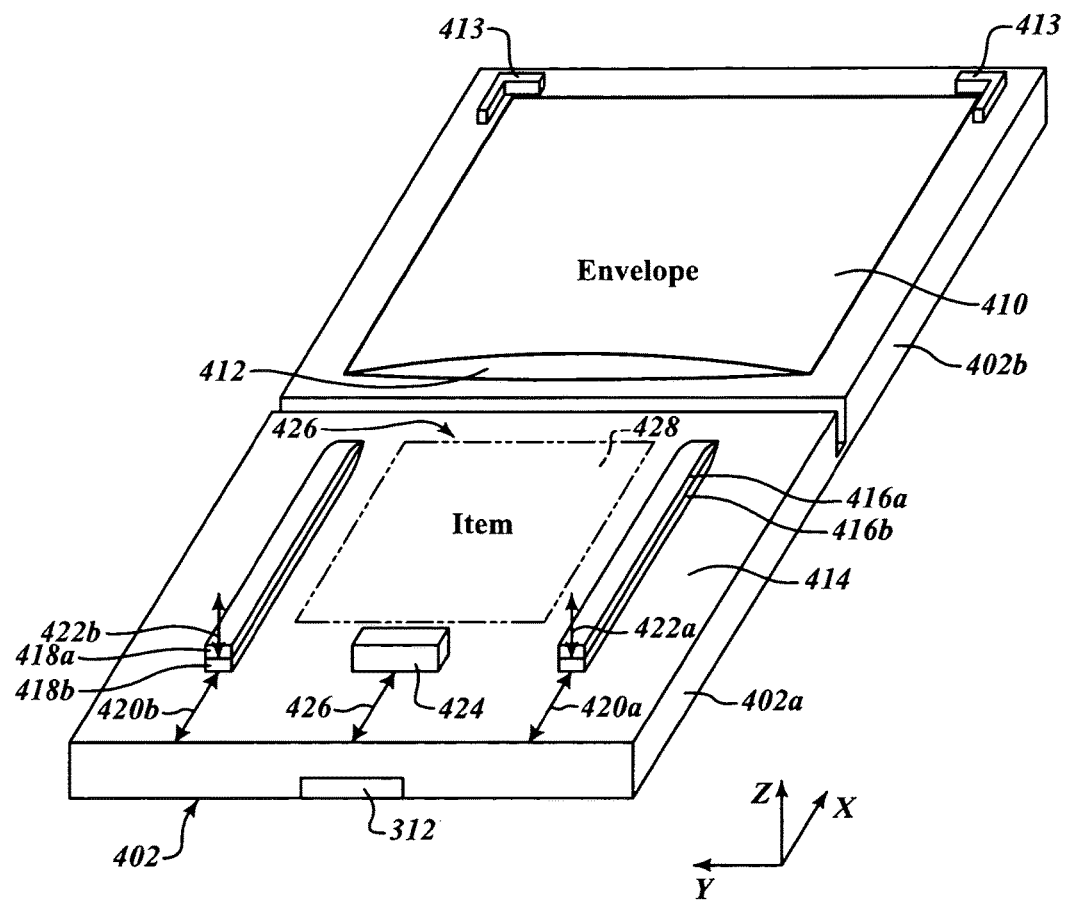
FIG. 5 illustrates a functional tray having an envelope-opening mechanism and an item-pushing mechanism, according to some embodiments.

FIG. 4 illustrates an example of a conveyor 400, to which schematically illustrated functional trays 402-406 are attached, each including an envelope-opening mechanism and an item-pushing mechanism. In the illustrated embodiment, each of the functional trays 402-406 consists of a functional sub-tray 402a-406a and an envelope receiving sub-tray 402b-406b. Referring additionally to FIG. 5, further details of the functional tray 402 are illustrated, which consists of the functional sub-tray 402a and the envelope receiving sub-tray 402b. As shown, the envelope receiving sub-tray 402b is sized to receive an envelope 410 thereon, with the envelope's opening 412 facing the functional sub-tray 402a. The envelope receiving sub-tray 402b may include one or more guides 413 to facilitate precise positioning of the envelope 410 thereon. Additionally or alternatively, an air suction element (not shown) may be provided in or on the envelope receiving sub-tray 402b so as to retain the envelope 410 from underneath by suction. The functional sub-tray 402a includes a plate body 414 having a first dimension (e.g., X dimension) and a second dimension (e.g., Y dimension) that are orthogonal to each other. As discussed above, the plate body 414 includes a coupler 312 configured to be removably attached to the conveyor 400. The functional tray 402 is attached to the conveyor 400 such that the second dimension (Y dimension) of the plate body 414 lies generally in parallel with a moving direction (Y direction) of the conveyor 400 (see FIG. 4).

While the illustrated embodiment of the functional tray 402 consists of two sub-trays 402a and 402b, construction of the functional tray 402 is not limited to this configuration and the functional tray 402 may be formed as a unitary planar piece, or may consist of three or more sub-tray portions, depending on ease of manufacture and assembly or on the structure and type of a conveyor to which the functional trays 402 are to be removably attached.

Referring specifically to FIG. 5, the functional sub-tray 402a includes a pair of arms 416a and 416b extending along the first dimension (X dimension) and slidably coupled to the plate body 414 in the first dimension. In the illustrated embodiment, a second pair of arms 418a and 418b are also provided to extend along the first dimension (X dimension) and slidably coupled to the plate body 414 in the first dimension, though one pair of arms may be sufficient in some embodiments. The functional sub-tray 402a further includes a first linear actuator 420a/420b configured to move the pair(s) of arms 416a and 416b/418a and 418b relative to the plate body 414 along the first dimension (X dimension). The functional sub-tray 402a also includes a second linear actuator 422a/422b configured to move the pair(s) of arms 416a and 416b/418a and 418b relative to each other (i.e., apart from each other or closer to each other) along a third dimension (e.g., Z dimension) that is orthogonal to the plate body 414. The first and second linear actuators 420 and 422 may take various forms depending on each application, including a mechanical actuator (cam mechanism), an electric actuator (motor), and a hydraulic actuator, and are mounted on or within the plate body 414.

The functional sub-tray 402a further includes a pusher block 424 slidably coupled to the plate body 414, and a third linear actuator 426 configured to move the pusher block 424 relative to the plate body 414 along the first dimension (X dimension). The third linear actuator 426 may be configured similarly to the first linear actuator 420a/420b.

As illustrated, according to exemplary embodiments of the invention, the pusher block 424 is arranged between the two pairs of arms 416a and 416b/418a and 418b such that the pusher block 424 and the two pairs of arms 416a and 416b/418a and 418b together define an item receptacle area 426 in which an item (or items) 428 to be packaged can be placed. That is, the item receptacle area 426 is defined to permit easy and precise positioning of the item 428 for the purpose of placing the item 428 into the envelope 410, as will be more fully described below.

Figure 6A:
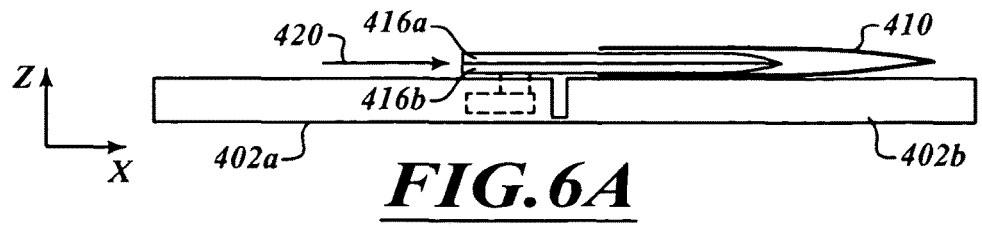
FIGS. 6A-6D illustrate the operational flow of the envelope-opening mechanism and the item-pushing mechanism provided in the functional tray of FIG. 5 to open an envelope and to push an item into an opened envelope.

FIGS. 6A-6D illustrate the operation of the functional tray 402 of FIG. 5 including the envelope-opening mechanism and the item-pushing mechanism. In FIG. 6A, the first linear actuator 420 moves the pair of arms 416a/416b relative to the plate body 414 along the first dimension (X dimension) such that the pair of arms 416a/416b are partially over the envelope receiving sub-tray 402b. In the illustrated example, the plate body 414 may be provided with a slit or rail (not shown) along which the pair of arms 416a/416b may slide along the first dimension (X dimension). The pair of arms 416a/416b are moved relative to the plate body 414 so as to extend into the inside of the envelope 410 provided on the envelope receiving sub-tray 402b of the functional tray 402. To facilitate easy insertion of the pair of arms 416a/416b into the envelope 410, a distal end portion of the pair of arms 416a/416b may be formed in a generally tapering (or narrowing) profile, as shown.

Figure 6B:
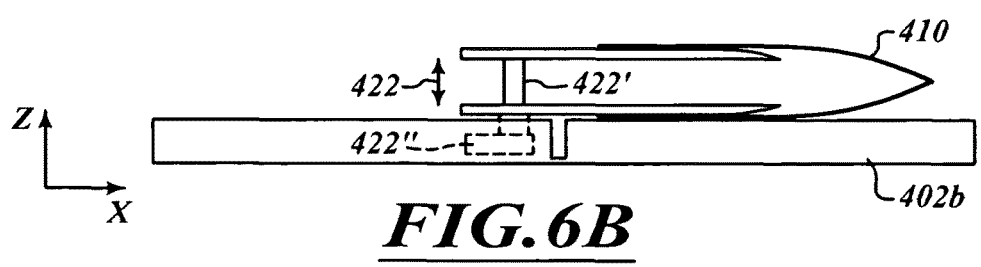

FIG. 6B shows that, once the pair of arms 416a/416b are inserted in the envelope 410, then the second linear actuator 422 is activated to move the pair of arms 416a/416b apart from each other along the third dimension (Z dimension). In the illustrated embodiment, the second linear actuator 422 includes an extendable shaft 422' driven by a gear box 422" including a motor and a cam, for example. At this point, the pair of arms 416a/416b, which are separated from each other, cause the envelope 410 to be opened, as illustrated.

Figure 6C:
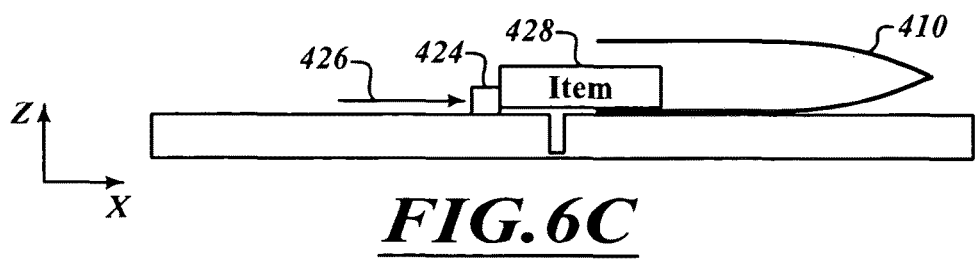

With the pair of arms 416a/416b inserted in the envelope 410 and separated from each other to hold the envelope 410 open, the third linear actuator 426 may be activated to move the pusher block 424 relative to the plate body 414 to push the item 428 into the opened envelope 410, as shown in FIG. 6C. Alternatively, if the envelope 410 is formed of sufficiently rigid material such that it can maintain its opened position without external support, then before the third linear actuator 426 is activated to move the pusher block 424, the first and/or second linear actuators 420 and 422 may be retracted to bring the pair of arms 416a/416b back to their original position. Specifically, the second linear actuator 422 may be activated (again) to fold together (close) the pair of arms 416a/416b, as in FIG. 6A, and the first linear actuator 420 may be activated to retract the pair of (folded) arms 416a/416b to be placed entirely on the functional sub-tray 402a, as shown in FIG. 5, before or during the third actuator 426 is activated to push the item 428 into the opened envelope 410. FIG. 6C does not show the pair of arms 416a/416b for the purpose of clear illustration and also because the position and status of the pair of arms 416a/416b, which are used to open the envelope 410, may vary depending on each application, as discussed above.

Figure 6D:
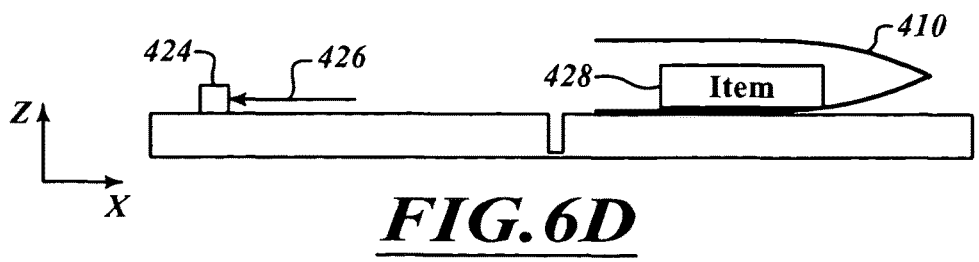

FIG. 6D shows that the item 428 is fully received in the envelope 410. Then, the third linear actuator 426 is activated to retract the pusher block 424 to its original position. At this point, the functional tray 402 is returned to its original state as shown in FIG. 5 and is ready to receive another item 428 in the item receptacle area 426 of the functional sub-tray 402.

Referring additionally to FIG. 4, the functional trays 402-406 including the envelope-opening mechanism and the item-pushing mechanism, as discussed above, may be arranged on the conveyor 400 such that the functional trays 402-406 respectively and continuously place items 428 into envelopes 410 as they are carried on the conveyor 400. In FIG. 4, the functional tray 402 in the upstream is illustrated to be in the process of pushing an item 428 into an envelope 410 with the pusher block 424 and the third linear actuator 426, while the pairs of arms 416 and 418 are folded (closed) together and retracted to their original positions on the functional sub-tray 402a by the first and second linear actuators 420 and 422. The functional tray 403 next to the functional tray 402 is similarly in the process of pushing an item further into an envelope. On the functional tray 404 next to the functional tray 403, an item has been fully received in an envelope, and the pusher block 424 is being retracted by the third linear actuator 426, while the pairs of arms 416 and 418 remain folded and retracted to their original positions. The functional trays 405 and 406 in the downstream have similarly completed the process of placing an item in an envelope, so an envelope containing an item is sitting on the envelope receiving sub-tray 405b and 406b of each of the functional trays 405 and 406.

According to various embodiments, multiple functional trays removably attached to a conveyor may be configured and arranged to interact with or cooperate with other conveyors or workstations found in a materials handling facility. FIG. 4 shows that a secondary conveyor 407 including multiple trays 409 is provided relative to the conveyor 400 so as to "catch" the fully stuffed envelopes 410' dropping from the conveyor 400. Thereafter, the stuffed envelopes 410' may be closed, for example, on the second conveyor 407 itself or on a workstation placed relative to the second conveyor 407.

In case the stuffed envelopes are to be closed on the second conveyor 407 itself, a functional tray including an envelope-closing mechanism may be provided and removably attached to the second conveyor 407. That is, the multiple trays 409 provided on the second conveyor 407 may be functional trays including an envelope-closing mechanism and removably attached to the second conveyor 407. Then, those functional trays may automatically or semi-automatically close the stuffed envelopes 410' received from the conveyor 400.

Figure 7A:
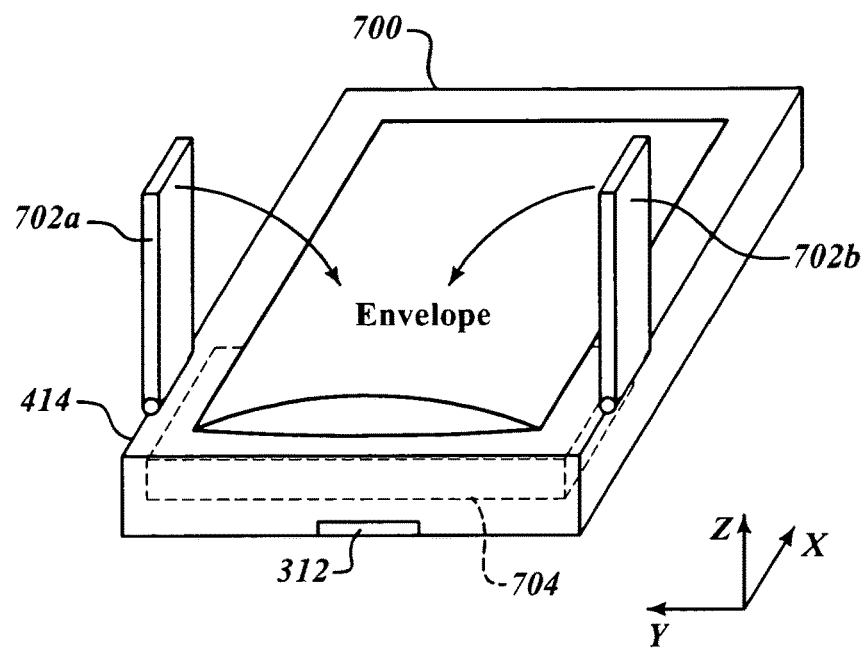
FIGS. 7A and 7B illustrate a functional tray having an envelope-closing mechanism, according to some embodiments.
Figure 7B:
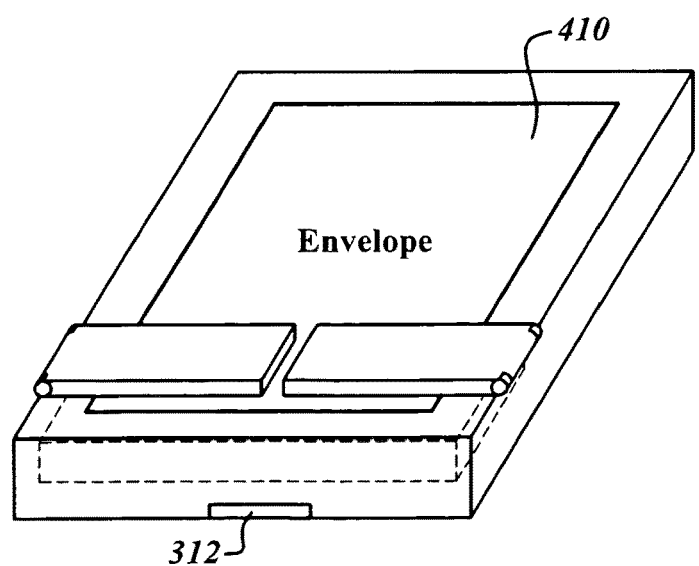

FIGS. 7A and 7B show an example of a functional tray 700 including an envelope-closing mechanism. The envelope-closing mechanism includes two bars 702a and 702b that are pivotally coupled to two edges along the first dimension (X dimension) of the plate body 414 of the functional tray 700. The functional tray 700 includes a drive mechanism 704 (shown as contained inside the plate body 414) that is configured to "close" (or fold) the bars 702a/702b to thereby seal the opening of the envelope 410, as shown in FIG. 7B. If the opening of the envelope is applied with self-adhesive material, then the pressure applied by the bars 702a and 702b may be sufficient to seal the envelope 410. Alternatively or additionally, the bars 702a and 702b may be configured to apply heat so as to heat-seal the opening of the envelope 410.

Various types of functional trays are possible to perform one or more functions, and may be configured depending on the type of item to be processed or the type of processing desired to be performed on each item. With all types of functional trays, however, a common coupler 312 should be provided such that various functional trays can be readily exchanged (removed and replaced) on a conveyor.

Figure 8A:
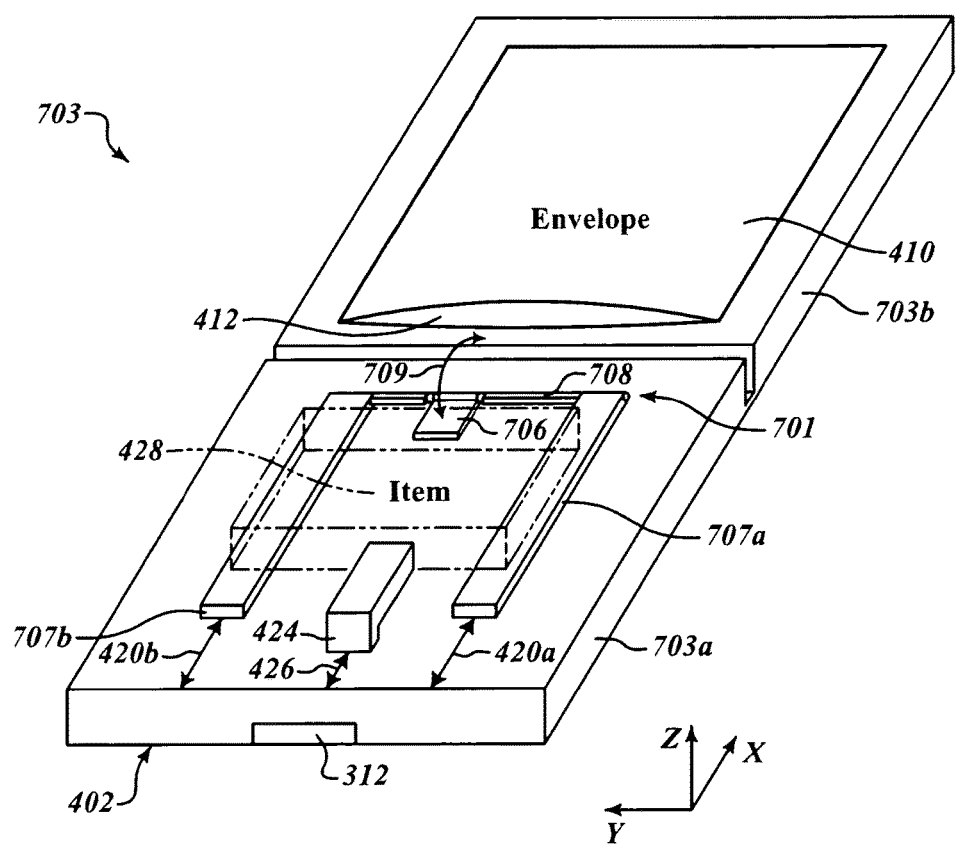
FIGS. 8A-8E illustrate another example of a functional tray having an envelope-opening mechanism and an item-pushing mechanism, according to other embodiments.

FIGS. 8A-8E illustrate another example of a functional tray 703 including an alternative embodiment of an envelope-opening mechanism. The functional tray 703, similar to the functional tray 402 of FIG. 5, consists of a functional sub-tray 703a and an envelope receiving sub-tray 703b. The functional sub-tray 703a includes the pusher block 424 and the third linear actuator 426 that linearly moves the pusher block 424, as with the embodiment of FIG. 5. In FIG. 8A, however, in place of the pairs of arms (416/418), a multiple-prong unit 701 is provided, which includes a short central prong 706 and two long side prongs 707a and 707b in the illustrated example. One ends of the central and side prongs 706, 707a, and 707b are all connected to a beam 708 that extends substantially perpendicularly to the prongs. The central prong 706 is pivotally connected to the beam 708, and the functional sub-tray 703a further includes a fourth actuator 709 configured to pivot the central prong 706 about the beam 708 as a pivoting axis. The fourth actuator 709 may be a mechanical, electrical, or hydraulic actuator, and some portion of the fourth actuator 709 may be provided inside the plate body 414. As in the previous embodiment of FIG. 5, the functional sub-tray 703a also includes one or more first linear actuators 420a and 420b that are configured to move the multiple-prong unit 701 relative to the plate body 414 along X dimension.

In exemplary embodiments, an item 428 to be placed inside an envelope 410 is initially placed over the side prongs 707a and 707b, but not over the central prong 706 so as not to interfere with its pivoting motion.

Figure 8B:
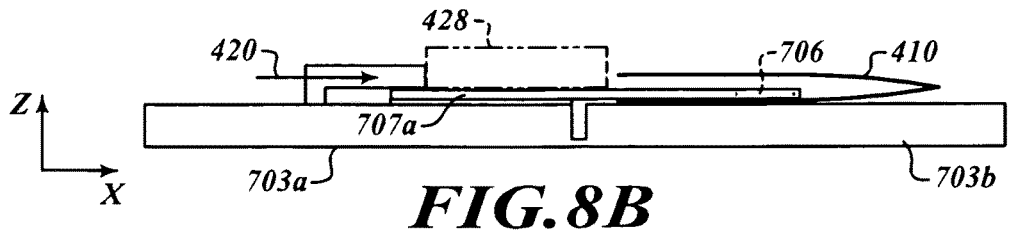

FIGS. 8B-8E illustrate the operation of the functional tray 703 of FIG. 8A, which includes the multiple-prong unit 701 as part of an envelope-opening mechanism. In FIG. 8B, the first linear actuator(s) 420 move the multiple-prong unit 701 relative to the plate body 414 along the first dimension (X dimension) such that a distal end of the multiple-prong unit 701 is extended over the envelope receiving sub-tray 703b and inserted into the inside of the envelope 410. In this connection, the plate body 414 may be provided with a slit or rail (not shown) along which the multiple-prong unit 701 may slide along the first dimension (X dimension). To facilitate easy insertion of the multiple-prong unit 701 into the envelope 410, the multiple-prong unit 701, in particular its distal end portion, may be formed to have a small height in Z dimension. In some embodiments, the item 428 may be carried by the side prongs 707a and 707b of the multiple-prong unit 701, as illustrated. At this time, the third linear actuator 426 may be activated to move the pusher block 424 to push the item 428 along X dimension, in synchronization with movement of the multiple-prong unit 701 by the first linear actuators 420a and 420b. Alternatively, the multiple-prong unit 701 may be inserted into the envelope 410 without carrying the item 428 thereon, and the item 428 may be independently pushed into the envelope 410 by the pusher block 424 after the multiple-prong unit 701 is inserted into the envelope 410.

Figure 8C:
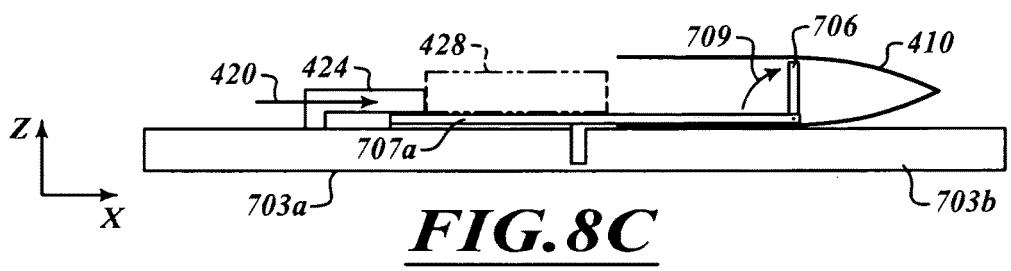

FIG. 8C shows that, when the distal end of the multiple-prong unit 701 is inside of the envelope 410, the fourth actuator 709 is activated to pivot the short central prong 706 about the beam 708 until the short central prong 706 becomes upright, i.e., substantially perpendicular to the surface of the functional tray 703. The pivoting movement of the central prong 706 opens up the envelope 410 from inside. After the envelope 410 is opened, the third linear actuator 426 is activated to move the pusher block 424 to push the item 428 into the opened envelope 410, as illustrated.

Figure 8D:
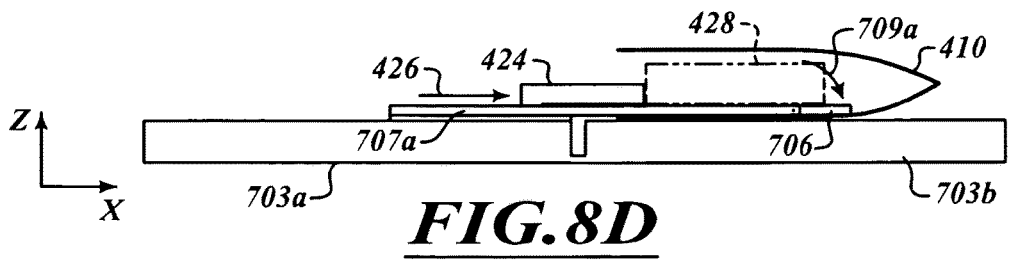

FIG. 8D shows that, as the third linear actuator 426 continues to move the pusher block 424 to push the item 428 further into the opened envelope 410, the short central prong 706 is pivoted further by 90 degrees, as indicated by arrow 709a, to be placed substantially flat on the envelope-receiving sub-tray 703b. The pivoting movement indicated by arrow 709a may be caused by further activation of the fourth actuator 709 or by the item 428 pushing over the short central prong 706.

Figure 8E:
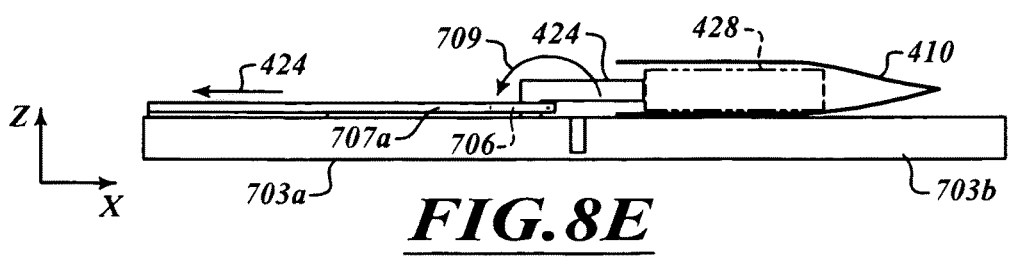

As shown in FIG. 8E, after the item 428 is fully received inside the envelope 410, with the pusher block 424 holding the item 428 in the envelope 410, the first linear actuator(s) 420 are activated to retract the multiple-prong unit 701 back to its original position on the functional sub-tray 703a. In some embodiments, to prevent the item 428 from being dragged back out of the envelope 410 on the multiple-prong unit 701, the pusher block 424 is needed to keep pushing the item 428 inside the envelope 410. In other embodiments, if the item 428 is capable of remaining inside the envelope 410 due to its own weight or friction for example, the pusher block 424 may be retracted to its original position when or before the multiple-prong unit 701 is retracted to its original position. After the multiple-prong unit 701 is fully retracted, the fourth actuator 709 is activated to pivot the short central prong 706 by 180 degrees back to its original position on the functional sub-tray 703a. Further, if not already retracted, the third linear actuator 426 is activated to retract the pusher block 424 to its original position. At this point, the functional tray 403 is returned to its original state as shown in FIG. 8A and is ready to receive another item 428 on the long side prongs 707a and 707b of the multiple-prong unit 701.

Figure 9A:
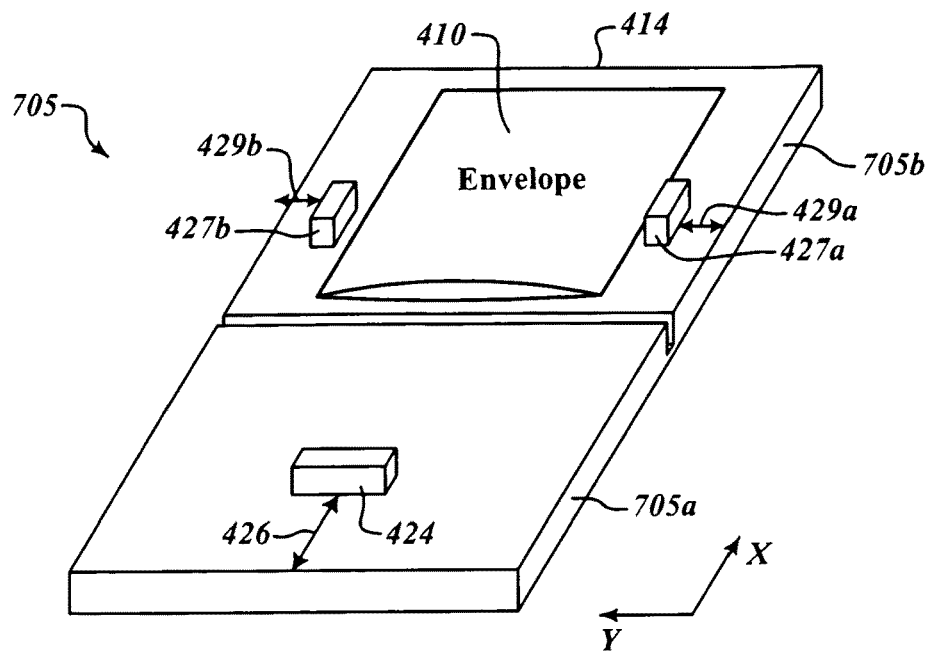
FIGS. 9A and 9B illustrate a further example of a functional tray having an envelope-opening mechanism and an item-pushing mechanism, according to other embodiments.
Figure 9B:
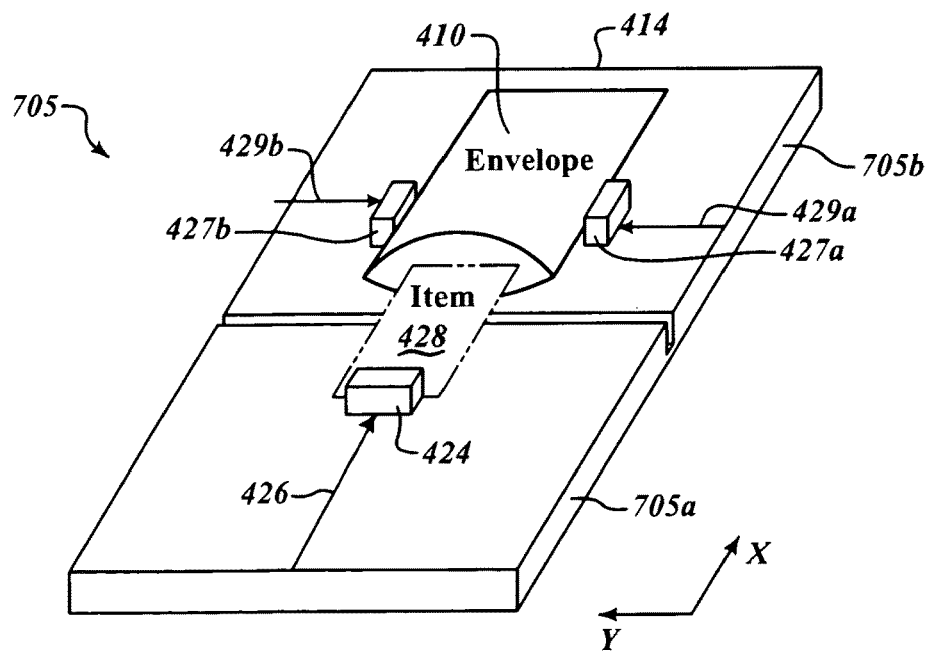

FIGS. 9A and 9B illustrate a further example of a functional tray 705 including an alternative embodiment of an envelope-opening mechanism. The functional tray 705, similar to the functional tray 402 of FIG. 5, consists of a functional sub-tray 705a and an envelope receiving sub-tray 705b. The functional sub-tray 705a includes the pusher block 424 and the third linear actuator 426 that linearly moves the pusher block 424, as with the previous embodiments. In FIG. 9A, however, an envelope-opening mechanism is provided not on the functional sub-tray 705 but instead on the envelope receiving sub-tray 705b. Specifically, the envelope receiving sub-tray 705b includes a pair of binder blocks 427a and 427b, which are provided and arranged to move in Y dimension relative to the plate body 414. To that end, fifth linear actuators 429a and 429b are provided to move the binder blocks 427a and 427b in Y dimension. As with other linear actuators, the fifth linear actuators 429a and 429b may be mechanical, electrical, or hydraulic, and some portion of the fifth linear actuators 429a and 429b may be provided inside the plate body 414. As illustrated, the pair of binder blocks 427a and 427b in their original positions generally define an area in which an envelope 410 is placed, with its opening facing the functional sub-tray 705a.

In operation, as shown in FIG. 9B, the fifth linear actuators 429a and 429b are activated to move the pair of binder blocks 427a and 427b closer together along Y dimension, to thereby push open the envelope 410 between the binder blocks 427a and 427b. After the envelope 410 is opened, the third linear actuator 426 is activated to move the pusher block 424 to push an item 428 into the opened envelope 410. As with previous embodiments, while the item 428 is being pushed into the envelope 410, the pair of binder blocks 427a and 427b may remain closer together to keep the envelope 410 open. Alternatively, if the envelope 410 can maintain an opened state without external support, the pair of binder blocks 427a and 427b may be retracted to their original positions by the fifth linear actuators 429a and 429b. After the item 428 is placed inside the envelope 410, the third linear actuator 426 is activated to move the pusher block 424 back to its original position, and the functional tray 705 becomes ready to receive another item.

Figure 10:
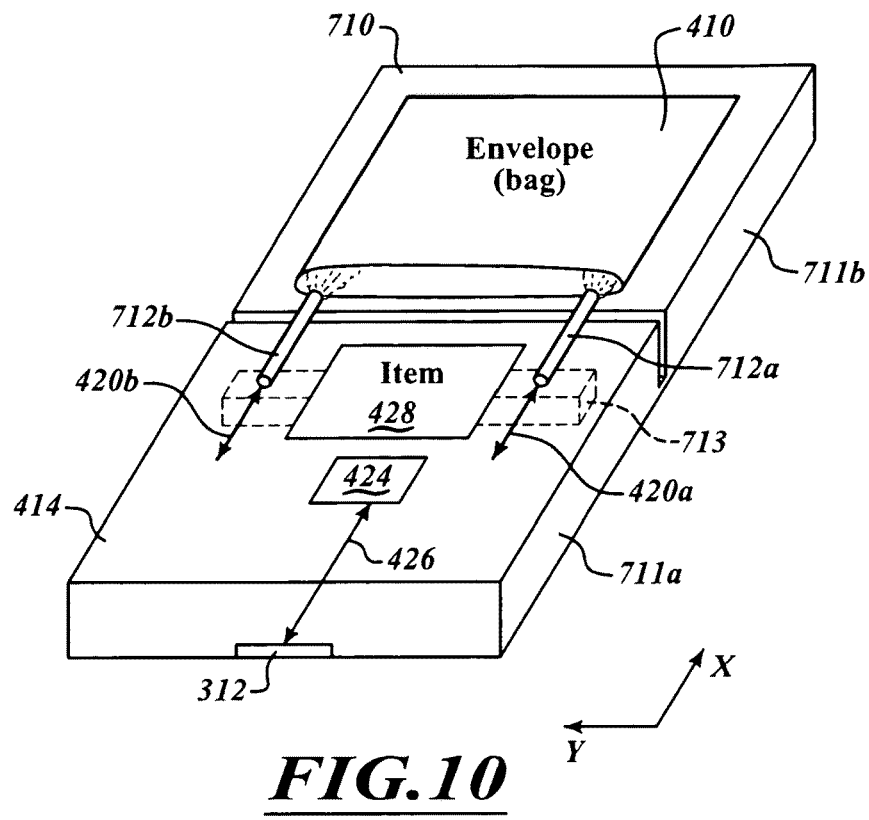
FIG. 10 illustrates yet another example of a functional tray having an envelope-opening mechanism and an item-pushing mechanism, according to other embodiments.

FIG. 10 illustrates yet another example of a functional tray 710 including an alternative embodiment of an envelope-opening mechanism. The functional tray 710, similar to the functional tray 402 of FIG. 5, consists of a functional sub-tray 711a and an envelope receiving sub-tray 711b. The functional sub-tray 711a includes the pusher block 424 and the third linear actuator 426 that linearly moves the pusher block 424, as with the embodiment of FIG. 5. In FIG. 10, however, in place of the pairs of arms (416/418), one or more air conduits 712a and 712b are provided and are coupled to the first linear actuators 420a and 420b such that the air conduits 712a and 712b may move relative to the plate body 414 along the first dimension (X dimension). The functional tray 710 still further includes an air pump 713 contained inside the plate body 414, to supply air to be delivered through the air conduits 712a and 712b.

In operation, similarly to the first embodiment shown in FIG. 6A, the first linear actuator 420 moves the air conduits 712a and 712b relative to the plate body 414 along the first dimension (X dimension) so that distal ends of the air conduits 712a and 712b are positioned adjacent to or inserted into the envelope 410. FIG. 10 shows the air conduits 712a and 712b, which have been moved such that their distal ends are placed adjacent to the envelope 410. Then, the air pump 713 is activated to deliver air through the air conduits 712a and 712b into the envelope to thereby open the envelope 410. Thereafter, the third linear actuator 426 is activated to move the pusher block 424 to push an item 428 into the opened envelope 410, as shown in FIG. 6C. As with the previous embodiment, while the item 428 is being pushed into the envelope 410, the distal ends of the air conduits 712a and 712b may remain positioned adjacent to or inside of the opened envelope 410 (with or without air being blown therefrom), or the air conduits 712a and 712b may be retracted to their original positions on the functional sub-tray 711a by the first linear actuator 420. After the item 428 is placed inside the envelope 410, the third linear actuator 426 moves the pusher block 424 back to its original position, as shown in FIG. 6D, and the functional tray 710 becomes ready to receive another item.

Figure 11:
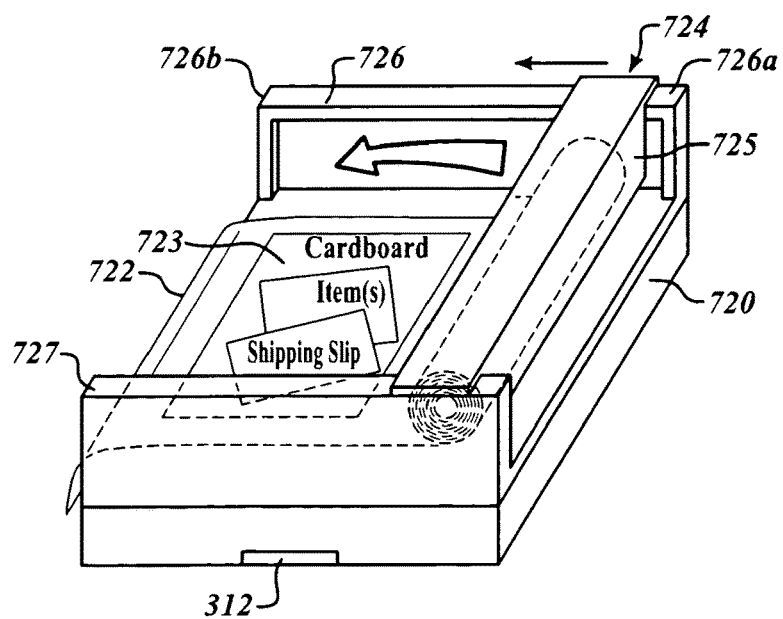
FIG. 11 illustrates a functional tray having an item-wrapping mechanism, according to some embodiments.

FIG. 11 illustrates an example of a functional tray including an item-wrapping mechanism. In the illustrated embodiment, a functional tray 720 of this embodiment is configured to shrink-wrap one or more items, together with a shipping slip, all provided on a rigid backing board (e.g., a corrugated cardboard). To that end, the functional tray 720 includes a shrink-wrap application mechanism 724 including a role of shrink-wrap 722 initially spread over a plate body 414 of the functional tray 720. In the illustrated embodiment, as with the functional tray 700 of FIGS. 7A and 7B, the functional tray 720 does not consist of multiple sub-tray portions and, instead, consists of a unitary piece.

Over the spread shrink wrap 722, a backing board 723 on which items and a shipping slip are mounted (hereinafter collectively called "a package"), is plated manually, semi-manually, or automatically. The shrink-wrap application mechanism 724 includes a beam 725 that is configured to slide along sliding arms 726 and 727, from a first end 726a to a second end 726b, while rolling out the shrink wrap 722 so as to shrink-wrap the package thereunder, with selective application of pressure and/or heat, and then to slide back to its original position near the first end 726a.

Figure 12:
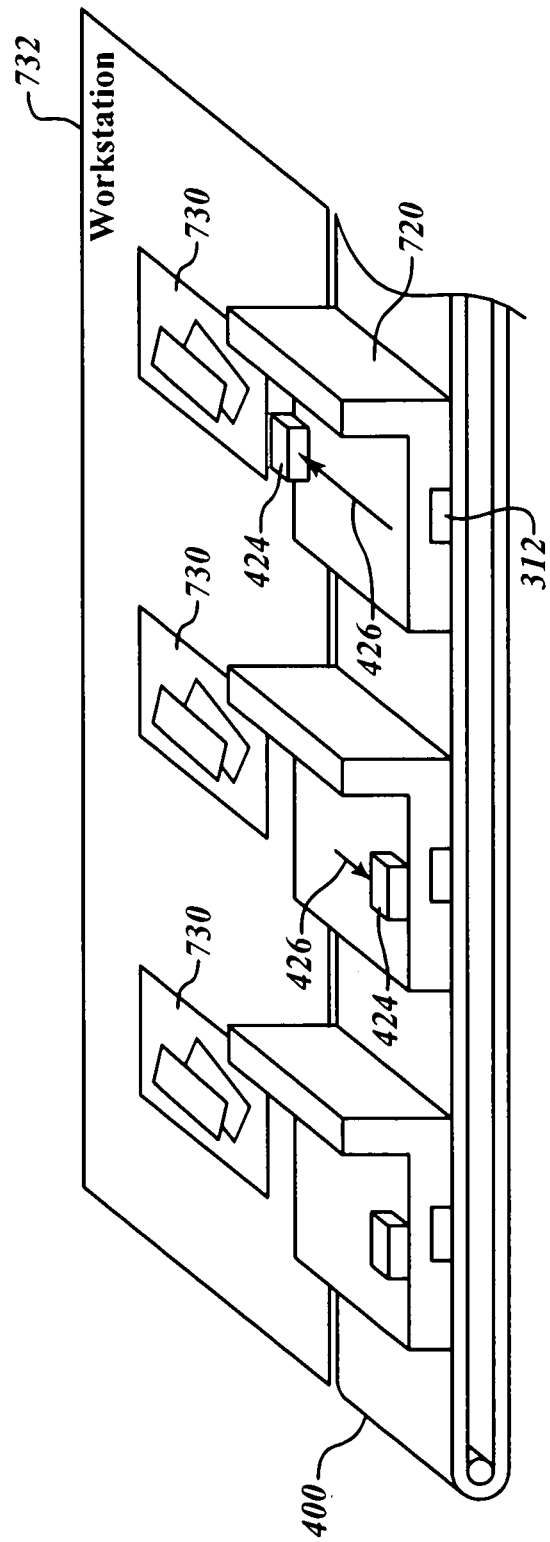
FIG. 12 illustrates an example of interaction between functional trays, each having an item-wrapping mechanism and an item-pushing mechanism, and a workstation situated adjacent to the conveyor.

Referring additionally to FIG. 12, the functional tray 720 including an item-wrapping mechanism may additionally include an item-pushing mechanism consisting of the pusher block 424 and the third linear actuator 426, as described above. In FIG. 12, the shrink-wrap application mechanism 724 is not illustrated for the purpose of clarity, but those skilled in the art will understand that the functional tray 720 of FIG. 12 may include a combination of both the item-pushing mechanism as illustrated in FIG. 12, and the item-wrapping mechanism as illustrated in FIG. 11. In this case, after a package is shrink-wrapped on the functional tray 720 by the shrink-wrap application mechanism 724, the third linear actuator 426 is activated to move the pusher block 424 to thereby push the shrink-wrapped package 730 onto a workstation 732 located adjacent to the conveyor 400.

FIG. 12 shows one example of interaction between the functional trays 720 removably attached on the conveyor 400 and another element, such as the workstation 732 in the illustrated example. Specifically, the functional trays 720 shrink-wrap packages, and thereafter push the shrink-wrapped packages 730 onto the workstation 732 for further processing.

Figure 13A:
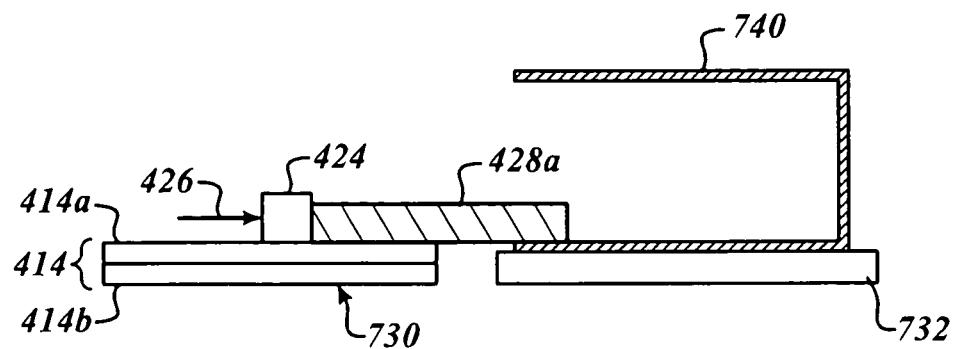
FIGS. 13A and 13B illustrate another example of interaction between functional trays, each having an item-pushing mechanism and a tray-height-adjustment mechanism, and a workstation situated adjacent to the conveyor.
Figure 13B:
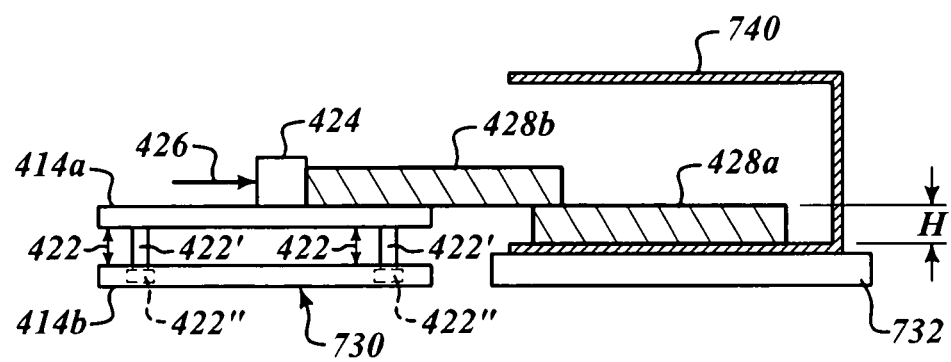

FIGS. 13A and 13B illustrate another example of interaction between a functional tray (attached to a conveyor) and another element, such as a workstation and another conveyor. A functional tray 730 of FIG. 13A includes an item-pushing mechanism comprising the pusher block 424 and the third linear actuator 426, as with the previous embodiments described above (e.g., FIG. 5). Additionally, the functional tray 730 includes a tray-height-adjustment mechanism to adjust the height of (the top surface of) the plate body 414 relative to the bottom surface of the plate body 414. To that end, the plate body 414 includes an upper plate body 414a and a lower plate body 414b, which are movable (separable) relative to each other. Referring additionally to FIG. 13B, which shows the height of the plate body 414 being adjusted (increased), the tray-height-adjustment mechanism is realized by a linear actuator 422, which in the illustrated embodiment includes an extendable shaft 422' driven by a gear box 422" including a motor and a cam, which is enclosed in the lower plate body 414b for example. The linear actuator 422 is configured to extend the extendable shaft 422' to thereby lift the upper plate body 414a relative to the lower plate body 414b, so as to adjust (increase) the height of the plate body 414. The linear actuator 422 may thereafter retract (shorten) the extendable shaft 422' so as to lower the height of the plate body 414 to its original height.

In operation, as shown in FIG. 13A, the upper plate body 414a is "folded" to be placed immediately on top of the lower plate body 414b. At this point, the top surface of the plate body 414 is substantially flush with the top surface of the workstation 732 provided adjacent to the conveyor, on which the functional tray 730 is removably attached. On the workstation 732, a shipping box 740 is provided, with its opening facing the functional tray 730. Then, an item 428a placed on the function tray 730 is pushed by the pusher block 424 (as activated by the third linear actuator 426) into the box 740 on the workstation 732. Then, the functional tray 730 that has placed the item 428a in the box 740 moves downstream on the conveyor.

FIG. 13B shows another one of the functional trays 730 on the same conveyor, which has come adjacent to the box 740 from upstream after the functional tray 730 of FIG. 13A has moved downstream. The functional tray 730 of FIG. 13B is carrying another item 428b to be also placed into the same box 740. However, since the first item 428a is already received inside the box 732, the height of the plate box 414 of the function tray 730 of FIG. 13B should be elevated by height (or thickness) "H" of the first item 428a; otherwise, the second item 428b would be butted against the first item 428a already in the box 740. Therefore, in the functional tray 730 of FIG. 13B, the linear actuator 422 is activated to elevate the upper plate body 414a by height "H" such that the top surface of the upper plate body 414a becomes substantially flush with the top surface of the first item 428a placed inside the box 740. At this point, the third linear actuator 426 is activated to move the pusher block 424 to push the second item 428b into the box 740 above the first item 428a already in the box 740.

As described above, various types of functional trays may be configured, readily exchanged on a conveyor, and combined on one or more conveyors, so as to achieve various configurations of a conveyor system suited for each application. Depending on what type of products or items are to be processed and/or what processing or handling is to be performed on those products or items, various combinations of functional trays on one or more conveyors can be realized. Some of the functional trays or, more specifically, some of the mechanisms installed in the functional trays may be simple enough such that they may be activated solely based on a cam mechanism driven by the rotation and movement of the conveyor 400. For example, a simpler form of an item-pushing mechanism including a pusher block 424 may be realized by constructing a third linear actuator 426 solely with a cam mechanism, which translates linear motion of the conveyor 400 in the second dimension (Y dimension) into rotary motion and then into linear (pushing) motion in the first dimension (X dimension). Alternatively or additionally, various other types of mechanisms included in functional trays require both driving power and a control signal for their proper operation. Thus, according to various embodiments of the invention, the coupler 312 of each tray is configured to receive driving power as well as a control signal via the conveyor 400. Alternatively, each functional tray may be provided with a power storage device (battery) to store power needed to activate mechanism(s) installed thereon. Further additionally or alternatively, a control signal for controlling operation of various mechanisms on functional trays may be transmitted wirelessly from the control system 102 (see FIG. 1). The control system 102 may include, but is not limited to, one or more computer systems, one or more data storage devices, one or more wired and/or wireless networks, and control system software (programs, modules, drivers, user interfaces, etc.). An exemplary computer system 800 that may be used in the control system 102 is illustrated in FIG. 14.

Figure 14:
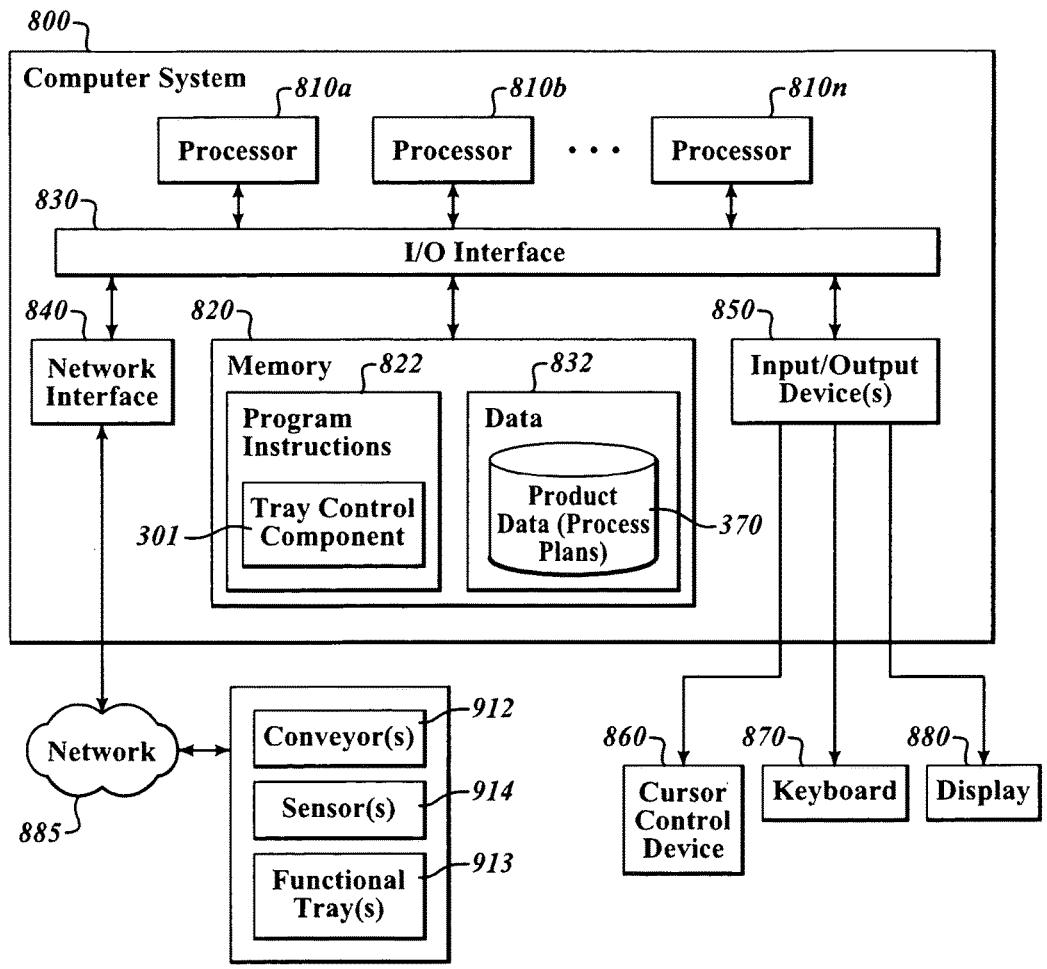
FIG. 14 is one example of a computer system suitable for implementing a conveyor system including a conveyor and a plurality of functional trays each removably attachable to the conveyor, in a materials handling facility, according to some embodiments.

Various embodiments of a system including a conveyor and multiple functional trays removably attached to the conveyor in a materials handling facility, as described herein, may be controlled by computer system 800 of FIG. 14. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such systems, Or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions 822 include a tray control component 301 for implementing control over various functional trays 913 attached to one or more conveyors 912. For example, the tray control component 301 may include instructions for controlling a functional tray including a tray-height-adjustment mechanism, such as instructions to activate the linear actuator 422 (see FIG. 13B) to change the height of the functional tray. As another example, the tray control component 301 may include instructions for controlling a functional tray including an envelope-opening mechanism of FIG. 5, such as instructions to activate the first linear actuator 420 to extend the pair of arms 416a/416b into an envelope and to activate the second linear actuator 420 to separate the pair of arms 416a/416b to thereby open the envelope. Data 832 of memory 820 may include product data 370 including process plans for processing or handling various products or items. For example, for each type of product, a process plan may indicate whether the product is to be packaged in an envelope or in a box, or to be shrink-wrapped, or whether the product may be stacked (in a box) on top of another product. In some embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network 885, including conveyor(s) 912, functional trays 916 removably attached to the conveyor(s), and sensor(s) 913 provided to monitor proper operation of a conveyor system for example. Network 885 may in various embodiments include one or more wired or wireless networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks such as any suitable type of Ethernet network; via telecommunications/telephony networks such as analog voice networks or digital fiber communications networks; via storage area networks such as Fibre Channel SANs; or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer accessible medium may include transmission media or signals such as electrical, electromagnetic, or digital signals, conveyed via a communication medium such as a network and/or a wireless link.

Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A functional tray to be removably attached to a conveyor, the functional tray comprising;
a plate having first and second dimensions that are orthogonal to each other, the plate including a coupler configured to be removably attached to a conveyor with the second dimension of the plate being in parallel with a moving direction of the conveyor;
a pair of arms extending along the first dimension and slidably coupled to the plate, the pair of arms including a first arm and a second arm overlaying the first arm;
a first linear actuator configured to move the pair of arms relative to the plate along the first dimension;

a second linear actuator configured to move the second arm relative to the first arm along a third dimension that is orthogonal to the plate;

a pusher slidably coupled to the plate; and a third linear actuator configured to move the pusher relative to the plate along the first dimension.

2. The functional tray of claim 1, further comprising:

two pairs of arms that includes the pair of arms and a second pair of arm, the second pair of arms extending along the first dimension and slidably coupled to the plate and including a third arm and a fourth arm overlaying the third arm;

wherein the first linear actuator is configured to move the two pairs of arms relative to the plate along the first dimension.

3. The functional tray of claim 2, wherein the pusher is arranged between the two pairs of arms such that the pusher and the two pairs of arms define an item receptacle area.

4. The functional tray of claim 1, wherein the coupler is selected from a group consisting of a latch system and a bolt system.

5. A conveyor system with multiple removable functional trays, the conveyor system comprising:

a conveyor; and a plurality of functional trays each removably attachable to the conveyor, each of the plurality of trays comprising a plate having first and second dimensions that are orthogonal to each other, the plate including a coupler configured to be removably attached to the conveyor with the second dimension of the plate being in parallel with a moving direction of the conveyor;

the plurality of functional trays including one or more of an envelope-opening mechanism, an item-pushing mechanism, an envelope-closing mechanism, an item-wrapping mechanism, and a tray-height-adjustment mechanism, wherein the envelope-opening mechanism includes:

a pair of arms extending along the first dimension and slidably coupled to the plate, the pair of arms including a first arm and a second arm overlaying the first arm;

a first linear actuator configured to move the pair of arms relative to the plate along the first dimension; and a second actuator configured to move the second arm relative to the first arm along a third dimension that is orthogonal to the plate.

6. The conveyor system of claim 5, wherein the envelope-opening mechanism comprises:

an air conduit slidably coupled to the plate;

a linear actuator configured to move the air conduit relative to the plate along the first dimension; and an air pump configured to deliver air through the air conduit.

7. The conveyor system of claim 5, wherein the item-pushing mechanism comprises:

a pusher slidably coupled to the plate; and a third linear actuator configured to move the pusher relative to the plate along the first dimension.

8. The conveyor system of claim 5, wherein the envelope-closing mechanism comprises a bar pivotally coupled to the plate to be in an open position and in a closed position, the bar in the closed position lying substantially in parallel with the plate.

9. The conveyor system of claim 5, wherein the item-wrapping mechanism comprises a shrink-wrapping mechanism.

10. The conveyor system of claim 5, wherein the plate includes an upper plate and a lower plate, and the tray-height-adjustment mechanism comprises a linear actuator configured to move the upper and lower plates relative to each other along the third dimension that is orthogonal to the plate.

11. The conveyor system of claim 5, wherein at least some of the plurality of functional trays include the item-pushing mechanism, and the conveyor system further includes a workstation arranged adjacent to the conveyor to receive items pushed by the item-pushing mechanism from some of the functional trays.

12. The conveyor system of claim 5, further including a secondary conveyor arranged adjacent to the conveyor to receive items processed by the plurality of functional trays attached to the conveyor.

13. The conveyor system of claim 5, wherein the envelope-opening mechanism comprises:

a pair of binders slidably coupled to the plate; and a fourth linear actuator configured to move the pair of binders along the second dimension.

14. The conveyor system of claim 13, wherein an area between the pair of binders defines an envelope receiving area.

15. The conveyor system of claim 5, further comprising:

a memory; and one or more processors coupled to the conveyor, the plurality of functional trays, and the memory, wherein the memory comprises program instructions executable by the one or more processors to control operation of the conveyor and the plurality of functional trays attached to the conveyor.

16. The conveyor system of claim 15, wherein at least some of the plurality of functional trays each include the envelope-opening mechanism and the item-pushing mechanism, and the memory comprises program instructions to control the envelope-opening mechanism to open an envelope on the functional tray, and to control the item-pushing mechanism to push an item into the opened envelope on the functional tray.

17. The conveyor system of claim 15, wherein the program instructions control the envelope-opening mechanism to activate the first linear actuator to move the pair of arms to be inserted inside of an envelope on one of the functional trays and to activate the second linear actuator to move the pair of arms apart from each other to open the envelope.

18. The conveyor system of claim 15, wherein the plate includes an upper plate and a lower plate, the tray-height-adjustment mechanism comprises a linear actuator configured to move the upper and lower plates relative to each other along the third dimension that is orthogonal to the plate, and wherein the program instructions control the tray-height-adjustment mechanism to activate the linear actuator to modify a distance between the upper plate and the lower plate.

19. The conveyor system of claim 15, wherein at least some of the plurality of functional trays each include the item-wrapping mechanism and the item-pushing mechanism, and the memory comprises program instructions to control the item-wrapping mechanism to shrink-wrap item(s) on the functional tray, and to control the item-pushing mechanism to push the shrink-wrapped item(s) off the functional tray.

* * * * *